United States Patent Office 3,093,598
Patented June 11, 1963

3,093,598
ELECTRICALLY CONDUCTIVE GLASSES
Peter William McMillan and Brian Purdam Hodgson, Stafford, England, assignors to The English Electric Company Limited, London, England, a British company
No Drawing. Filed Jan. 3, 1961, Ser. No. 80,039
Claims priority, application Great Britain Sept. 13, 1957
18 Claims. (Cl. 252—521)

This application is a continuation-in-part of our application Serial 757,444 filed on 27th August 1958 (now abandoned).

This invention relates to electrically-conductive glasses and to processes for their manufacture.

Glasses are normally ionic conductors having resistivities which vary widely in dependence upon the glass composition. It is generally accepted that it is the alkali ions which make the major contribution to the ionic conductivity of normal types of glass since these ions are more readily transported through the glass structure than the alkaline-earth ions. Under unidirectional applied voltage fields, however, the movement of alkali ions through the glass structure is not continuous over a long period of time since these ions migrate to the negative electrode producing a cathode layer rich in alkali ions. Thus, unless the glass at the anode is supplied with an external source of alkali ions, the conduction current will slowly decrease with time, i.e. polarization will occur. This phenomenon may be a disadvantage in applications where it is desired to utilize the conductive properties of the glass: an example of such an application occurring in the "targets" of conductive glass employed in photo-responsive electronic discharge devices such as those known as "image orthicons."

The present invention has for a primary object the provision of a glass which is, or which can be caused to become, an electronic conductor, and in which the phenomenon of polarization under unidirectional applied voltages therefore does not occur. Such glasses may advantageously be used in the photo-responsive discharge devices mentioned above, and other applications will be mentioned later in this specification.

According to the invention, the said object is achieved by the provision of certain mangano-silicate glasses and oxidizing treatment thereof.

A glass article homogeneous in physical composition may contain manganese ions in different states of valency and in such proportions and so distributed as to cause the glass to exhibit electronic conduction within a limited portion only, for example within only a surface layer.

Manganese ions can exist in glass in the divalent and trivalent states and possibly also in the quadrivalent state; it is thought that electron transfer between divalent and trivalent ions in the interstices of the glass network is at least primarily responsible for the conduction mechanism.

According to one aspect of the invention, a manganese silicate glass has the following molecular percentage composition:

| | Percent |
|---|---|
| Manganese, expressed as MnO | 36–55 |
| Aluminum, expressed as $Al_2O_3$ | 0–20 |
| Silicon, expressed as $SiO_2$ | 35–56 | the manganese being predominantly in its $Mn^{+2}$ valence state, and normal impurities being neglected.

In alternative compositions, not more than 5 molecular percent of the manganese is replaced by an alkaline-earth oxide, preferably magnesium oxide (MgO), calcium oxide (CaO) or barium oxide (BaO).

Glasses having compositions within these ranges exhibit electronic volume conductivity when prepared in the form of thin blown films of less than about one-thousandth of an inch in thickness; develop electronically-conductive surface layers on prepared surfaces when subjected to specified heat treatment; and can be used to prepare volume-conductive articles of appreciable thickness by applying sintering techniques to the ground glass. They may also be applied to ceramic articles to form electronically-conductive glazes thereon.

A number of glass compositions that have been investigated experimentally are set out, as percentage molecular compositions, in Table I.

*Table I*

| Glass | A | B | C | D | E | F | G |
|---|---|---|---|---|---|---|---|
| MnO | 40 | 40 | 40 | 40 | 45 | 50 | 55 |
| $Al_2O_3$ | 5 | 10 | 15 | 20 | 10 | 10 | 10 |
| $SiO_2$ | 55 | 50 | 45 | 40 | 45 | 40 | 35 |

The raw materials which may be used in the preparation of the glasses are manganous carbonate $MnCO_3$, calcined alumina, and ground quartz. The glasses are melted in recrystallized alumina crucibles, or in refractory ceramic crucibles containing a high proportion of zircon, at temperatures in the region of 1400° C. Maintenance of a controlled furnace atmosphere is not essential, air being suitable.

The characteristic physical properties of these glasses are as follows: they melt easily at a temperature of about 1350° C. being quite fluid at this temperature; the softening temperatures, measured as the dilatometric turnover temperature, range from 660° C.–720° C; their coefficients of linear thermal expansion, over the temperature interval 20° C.–500° C., range from $40 \times 10^{-7}$ to $66 \times 10^{-7}$ per degree centigrade, and their chemical durabilities are good—for example, they are not affected to any appreciable extent by exposure to the action of steam for a period of 200 hours.

With regard to spectral transmission properties, the glasses are found to transmit more readily in the infra-red region of the spectrum than in the visible region. For example, a sample 0.2 cm. in thickness of glass F transmits only slightly at the red end of the visible spectrum and cuts off the blue end completely, and a 0.4 cm. sample cuts off all visible radiation completely; in the infra-red region, however, the 0.2 cm. sample transmits radiation up to a wavelength of 5 microns, whereas boro-silicate glasses, for example, will not transmit beyond wavelengths of 3 to 3.5 microns.

The melted and refined glasses can be moulded by casting and other normal techniques. The shaped articles are placed in an electric muffle furnace immediately after the forming process, and annealed; a typical annealing schedule consists in maintaining the article at 650° C. for one hour and then allowing it to cool slowly to room temperature.

There is some evidence for believing that the surface of the article at this stage would exhibit electronic conductivity, but the nature of the surfaces precludes accurate measurement, and in any event the article would have limited practical application if it could not be ground and polished to an accurate form.

The surfaces of the shaped articles are now ground to their required form, and polished.

The surface electrical resistivities of ground and polished surfaces of sample glasses having the compositions given in Table I have been measured and the results are set out in Table II.

Table II

| Glass: | Surface resistivity in ohms at 1000 volts p.d. |
|---|---|
| A | $40 \times 10^{12}$ |
| B | $31 \times 10^{12}$ |
| C | $45 \times 10^{12}$ |
| D | $6 \times 10^{12}$ |
| E | $40 \times 10^{12}$ |
| F | $45 \times 10^{12}$ |
| G | $17 \times 10^{12}$ |

These resistivities are too high for the glasses in this form to be of practical use as conductive glasses, and indeed for practical purposes the ground and polished surfaces can be considered to be insulating. It is not known whether the very slight conductivity exhibited is electronic or ionic.

The ground and polished article is therefore now heat treated to produce a conductive surface layer. The temperature employed for the heat treatment is preferably between 550° C. and 700° C.; heating at these temperatures for a period between 30 minutes and 4 hours is found to be satisfactory, preferably about 4 hours.

The presence of oxygen is essential for the formation of the conductive layer, but the amount of oxygen in the furnace atmosphere is not critical. Air is quite suitable, and the use of an atmosphere containing a higher percentage of oxygen than air conveys no corresponding advantage. Commercial grade nitrogen contains about 2% of oxygen, and this (as in one of the examples given below) is sufficient to cause the development of the conductive layer when the article is heated in this atmosphere.

Table III shows the results of surface resistivity determinations carried out on surfaces of discs of the glasses whose compositions are given in Table I, the surfaces were ground and polished, and the discs heated in air for 4 hours at 600° C.

Table III

| Glass: | Surface resistivity in ohms, after heat treatment, at 100 volts p.d. |
|---|---|
| A | $1.2 \times 10^9$ |
| B | $3.5 \times 10^9$ |
| C | $2.9 \times 10^9$ |
| D | $17.2 \times 10^9$ |
| E | $1.7 \times 10^9$ |
| F | $0.6 \times 10^9$ |
| G | $1.0 \times 10^9$ |

It will be seen that glass F shows the development of the conductive layer to the most marked degree. By way of demonstrating the effects of varying conditions of heat treatment on the development of the conductive layer, Table IV gives the relative surface resistivities of samples of this glass heated for 4 hours in various atmospheres and at various temperatures.

Table IV

| Atmosphere | Temperature, °C. | Relative surface resistivity at 100 volts p.d. |
|---|---|---|
| Air | 550 | 15.5 |
| Do | 600 | 5.5 |
| Do | 650 | 1.3 |
| Do | 700 | 1.7 |
| Oxygen | 600 | 5.6 |
| 75% oxygen plus 25% nitrogen | 600 | 5.0 |
| 50% oxygen plus 50% nitrogen | 600 | 2.7 |
| 25% oxygen plus 75% nitrogen | 600 | 10.0 |
| Nitrogen (commercial quality) | 600 | 12.3 |
| 90% pure nitrogen plus 10% hydrogen | 600 | $>10^5$ |

An alternative method of utilizing the glass is to prepare it in the form of thin films, say between $10^{-4}$ inch and $5 \times 10^{-4}$ inch thick, by means of a blowing technique, using a silica or stainless steel tube. Resistivity measurements show that the films are volume-conductive, the mode of conduction being electronic. Glass F exhibits this effect in a marked degree, and Table V records experimental results obtained for blown films of this glass of various thicknesses.

Table V

| Glass F film thicknesses, inches: | Volume resistivity at 100 volts p.d., ohm-cm. |
|---|---|
| $21 \times 10^{-5}$ | $51 \times 10^{10}$ |
| $25 \times 10^{-5}$ | $49 \times 10^{10}$ |
| $30 \times 10^{-5}$ | $74 \times 10^{10}$ |
| $36 \times 10^{-5}$ | $25 \times 10^{10}$ |
| $38 \times 10^{-5}$ | $10 \times 10^{10}$ |
| $39 \times 10^{-5}$ | $5 \times 10^{10}$ |
| $42 \times 10^{-5}$ | $28 \times 10^{10}$ |
| $43 \times 10^{-5}$ | $39 \times 10^{10}$ |
| $44 \times 10^{-5}$ | $15 \times 10^{10}$ |
| $45 \times 10^{-5}$ | $9 \times 10^{10}$ |
| $57 \times 10^{-5}$ | $15 \times 10^{10}$ |
| $61 \times 10^{-5}$ | $14 \times 10^{10}$ |
| $64 \times 10^{-5}$ | $4 \times 10^{10}$ |

These are the results of a particular series of resistivity measurements, but they appear to show that there is some degree of correlation between resistivity and film thickness at least for the particular glass composition investigated. The volume resistivity of the films rises if they are heat treated in air at temperatures of about 600° C.

Another method of utilizing a glass having a composition within the range herein generally specified consists in treating it in powder form in an oxidizing atmosphere at a temperature within the range 550° C. to 1000° C. for a period between 30 minutes and 4 hours.

Before forming the desired article, the powdered glass may be heat treated in an oxidizing atmosphere, in the manner already described, at a temperature within the range 550° C. to 700° C., below the softening temperature of the glass, for a period between 30 minutes and 4 hours, preferably 4 hours. Thereafter it is sintered in an inert atmosphere to form the article.

Alternatively, the powder need not be heat treated, the conductive effect being developed by sintering in an oxidizing atmosphere such as air. This sintering can be carried out at a temperature within the range 950° C. to 1100° C. during a period between one hour and three hours, preferably three hours at 1000° C.

Articles produced by either of these sintering processes are mechanically strong, and have practically equal volume resistivities: a typical article produced by sintering a powder of glass F at 1000° C. for three hours had a volume resistivity of $48 \times 10^6$ ohm-cm.

It is suggested that the conduction process in these glasses involves electron transfer between ions of the same element which are present in different states of valency in the interstices of the glass network. It is thought that the increase in surface conduction which takes place when these glasses are heated in atmospheres containing oxygen is due to the absorption of oxygen with a change in the state of oxidation of some of the manganese ions from the initially predominating divalent ions to the trivalent ion. Heat treatment of the glasses in neutral or reducing atmospheres does not result in the conversion of divalent manganese ions to the trivalent form and does not therefore result in the development of the conducting effect.

Observations of the development of surface conductivity during heat treatment have been carried out on ground and polished surfaces of the glasses. Any surface effects developed during the moulding of the glasses and their subsequent annealing were removed by the grinding process. This did not however apply to the thin films of the glasses on which determinations of volume resistivity were carried out and in this case the surfaces of the glasses formed during the blowing operation were retained. It is thought that a certain proportion of the manganese ions in the surface layers of these films were converted from the divalent to the trivalent forms resulting in the development of volume conducting films of the glasses. Subsequent heat treatment of the films in oxygen-containing atmospheres then resulted in the conversion of too large a proportion of the divalent ions to the trivalent form resulting in the development of glass film with increased volume resistivity.

It has already been mentioned that an important application of conductive glasses prepared in accordance with the present invention is in the manufacture of targets for "image orthicon" discharge tubes or similar tubes where thin electronically conducting films or targets are required. Other applications are as electrically conducting glazes for application to ceramic insulators or other articles, the glaze being fixed on to the ceramic in air or other oxidizing atmosphere to ensure the development of electronic conductivity in the glaze; or for the construction of insulators which could be heat treated to develop electrically conducting surface layers. The last mentioned application would be of use in the graduation of high voltages between two conductors.

What we claim as our invention and desire to secure by Letters Patent is:

1. A process for producing a glass article which is electronically conductive which comprises maintaining glass having the molecular percentage composition, neglecting impurities: silicon, expressed as $SiO_2$, 35–56%; aluminum, expressed as $Al_2O_3$, 0–20%; manganese, expressed as MnO, 36–55%, the manganese being predominantly in its $Mn^{+2}$ valence state, and said glass also having a softening point, measured as the dilatometric turnover temperature, in the range 660–720° C., at a temperature within the range 550° C. to 1,000° C. for a period of between thirty minutes and approximately four hours in an oxidizing atmosphere.

2. A process as claimed in claim 1 wherein said glass is in powder form.

3. A process according to claim 2 wherein the powdered glass has the molecular percentage composition: silicon, expressed as $SiO_2$, 40%; aluminum, expressed as $Al_2O_3$, 10%; manganese, expressed as MnO, 50%, the manganese being predominantly in its $Mn^{+2}$ valence state.

4. A process according to claim 2 wherein not more than 5 molecular percent of the manganese in the powdered glass is replaced by an alkaline-earth oxide.

5. A process for producing a glass article which is electronically conductive which comprises sintering glass in powder form and having a molecular percentage composition, neglecting impurities: silicon, expressed as $SiO_2$, 35–56%; aluminum, expressed as $Al_2O_3$, 0–20%; manganese, expressed as MnO, 36–55%, the manganese being predominantly in its $Mn^{+2}$ valence state and said glass also having a softening point measured as the dilatometric turnover temperature in the range 660° C. to 720° C., at a temperature within the range 950° C. to 1100° C. for a period between one hour and three hours in an oxidizing atmosphere to form said article.

6. A process for producing a glass article which is electronically conductive which comprises maintaining glass in powder form and having the molecular percentage composition, neglecting impurities: silicon, expressed as $SiO_2$, 35–56%; aluminum, expressed as $Al_2O_3$, 0–20%; manganese, expressed as MnO, 36–55%, the manganese being predominantly in its $Mn^{+2}$ valence state and said glass also having a softening point measured as the dilatometric turnover temperature in the range 660° C. to 720° C., at a temperature within the range 550° C. to 700° C. for a period between thirty minutes and four hours in an oxidizing atmosphere and thereafter sintering the treated powdered glass in an inert atmosphere to form the article.

7. A process for producing a glass article which is electronically surface conductive which comprises forming a glass melt having the molecular percentage composition, neglecting impurities: silicon, expressed as $SiO_2$, 35–56%; aluminum, expressed as $Al_2O_3$, 0–20%; manganese, expressed as MnO, 36–55%, the manganese being predominantly in its $Mn^{+2}$ valence state; forming a solid shaped article from said melt, annealing said article, cooling said article to room temperature, grinding and polishing the surface of said annealed article, and thereafter maintaining said article at a temperature within the range 550° C. to 700° C. for a period of approximately four hours in an oxidizing atmosphere.

8. A process for producing a glass article which is electronically surface conductive which comprises forming a glass melt having the molecular percentage composition, neglecting impurities: silicon, expressed as $SiO_2$, 35–56%; aluminum, expressed as $Al_2O_3$, 0–20%; manganese, expressed as MnO, 36–55%, the manganese being predominantly in its $Mn^{+2}$ valence state; forming a solid shaped article from said melt, annealing said article, cooling said article to room temperature, grinding and polishing the surface of said annealed article, and thereafter maintaining said article at a temperature within the range 550° C. to 700° C. for a period of between thirty minutes and approximately four hours in an oxidizing atmosphere.

9. A process according to claim 8 wherein the glass melt has the molecular percentage composition: silicon, expressed as $SiO_2$, 40%; aluminum, expressed as $Al_2O_3$, 10%; manganese, expressed as MnO, 50%, the manganese being predominantly in its $Mn^{+2}$ valence state.

10. A process according to claim 8 wherein not more than 5 molecular percent of the manganese in the glass melt is replaced by an alkaline-earth oxide.

11. A process for producing an electronically conductive glass article which comprises forming a glass melt by heating batch materials in an oxidizing atmosphere, said glass melt having the molecular percentage composition: silicon, expressed as $SiO_2$, 35–56%; aluminum, expressed as $Al_2O_3$, 0–20%; manganese, expressed as MnO, 36–55%, the manganese being predominantly in its $Mn^{+2}$ valence state; said glass having a softening point, measured as the dilatometric turnover point in the range of about 660° C.–720° C., and blowing said melt in an oxidizing atmosphere to form an electronically conductive glass film having a thickness in the range $1 \times 10^{-4}$ to $5 \times 10^{-4}$ inches.

12. A process according to claim 11 wherein the glass melt has the molecular percentage composition: silicon, expressed as $SiO_2$, 40%; aluminum, expressed as $Al_2O_3$, 10%; manganese, expressed as MnO, 50%, the manganese being predominantly in its $Mn^{+2}$ valence state.

13. A process according to claim 11 wherein not more than 5 molecular percent of the manganese in the glass melt is replaced by an alkaline-earth oxide.

14. A process according to claim 13 wherein said alkaline-earth oxide is selected from the group consisting of magnesium oxide, calcium oxide and barium oxide.

15. A manganese silicate glass which is electronically volume conductive, having the molecular percentage composition, neglecting impurities: silicon, expressed as $SiO_2$, 35–56%; aluminum, expressed as $Al_2O_3$, 0–20%; and manganese, expressed as MnO, 36–55%, the manganese being predominantly in its $Mn^{+2}$ valence state, said glass having a softening temperature, measured as the dilatometric turnover temperature, in the range 660–720° C. and said glass having been heated in an oxidizing atmosphere to convert part of said manganese to the $Mn^{+3}$ valence state, and thereby to produce said electronic conductivity.

16. A manganese silicate glass as claimed in claim 15 having the molecular percentage composition: silicon, expressed as $SiO_2$, 40%; aluminum, expressed as $Al_2O_3$, 10%; manganese, expressed as MnO, 50%, the manganese being predominantly in its $Mn^{+2}$ valence state; normal impurities being neglected; said glass having a softening temperature, measured as the dilatometric turnover temperature, in the range 660° C.–720° C. and said glass having been heated in an oxidizing atmosphere to convert part of said manganese to the $Mn^{+3}$ valence state, and thereby to produce said electronic conductivity.

17. A glass according to claim 15 wherein not more than 5 molecular percent of the manganese is replaced by an alkaline-earth oxide.

18. A glass according to claim 17 wherein said alkaline-earth oxide is selected from the group consisting of magnesium oxide, calcium oxide and barium oxide.

References Cited in the file of this patent

UNITED STATES PATENTS

| | | |
|---|---|---|
| 2,290,107 | Luks | July 14, 1942 |
| 2,720,573 | Lundquist | Oct. 11, 1955 |
| 2,785,142 | MacIntyre | Mar. 12, 1957 |